May 11, 1943.
G. W. PARKER, JR
2,318,794
TRUCK BODY
Original Filed Dec. 1, 1938    8 Sheets-Sheet 2
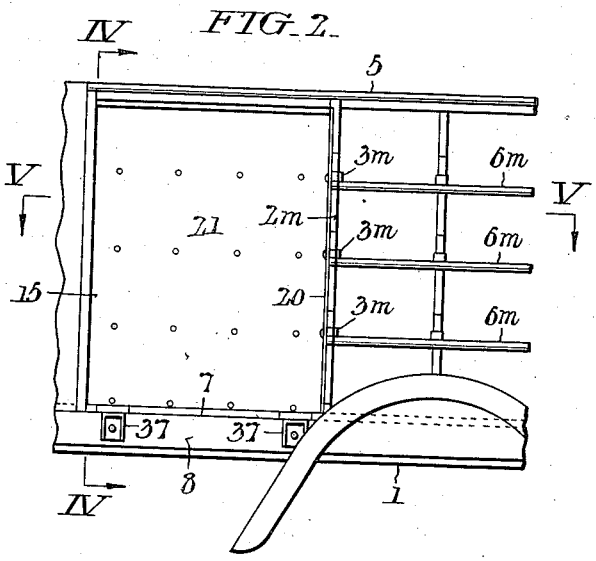
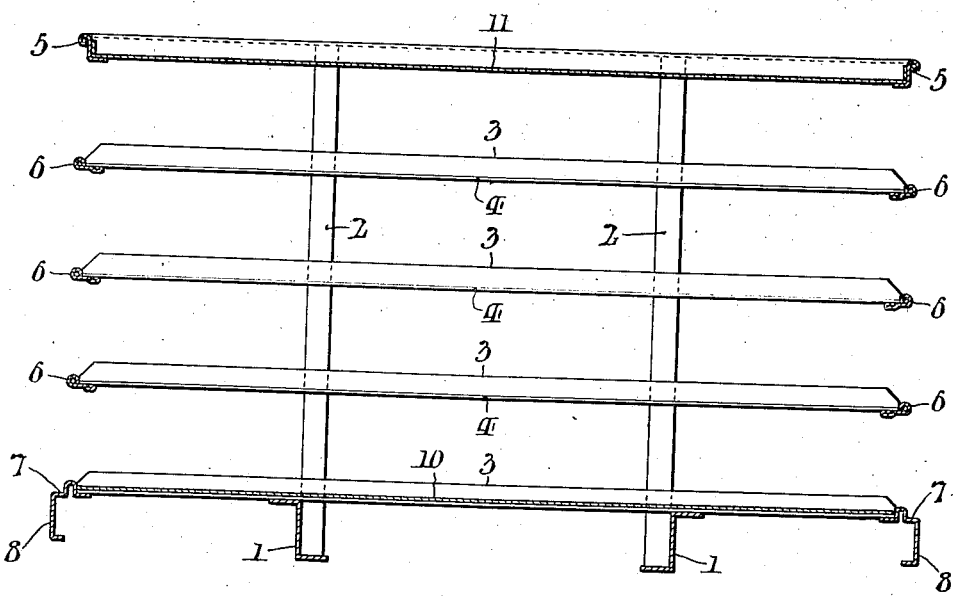
WITNESSES:
INVENTOR:
George W. Parker, Jr.
BY
ATTORNEYS.

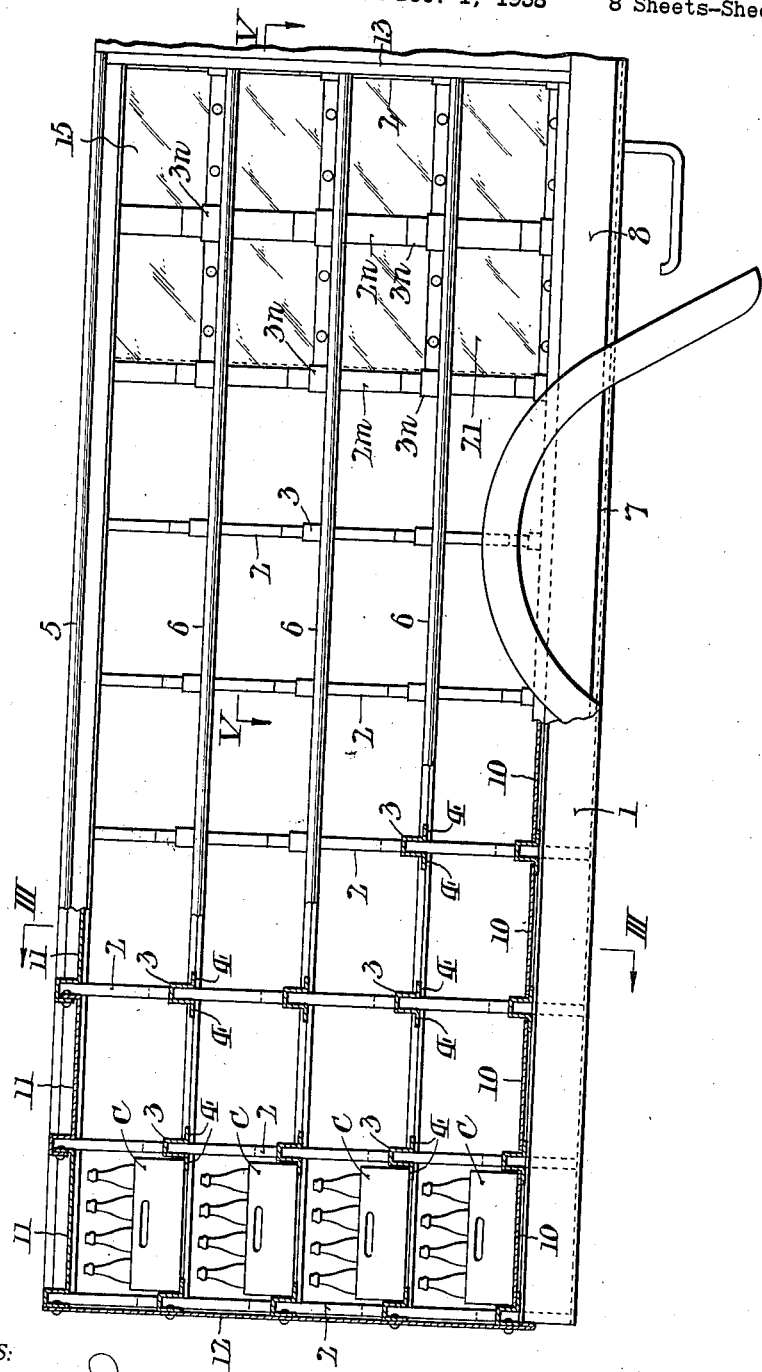

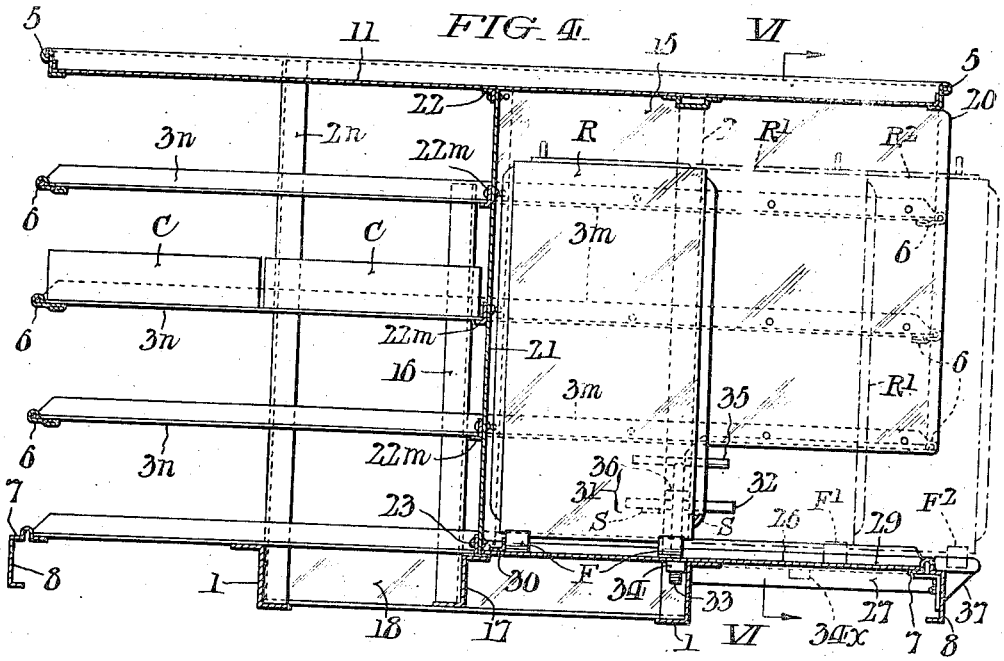
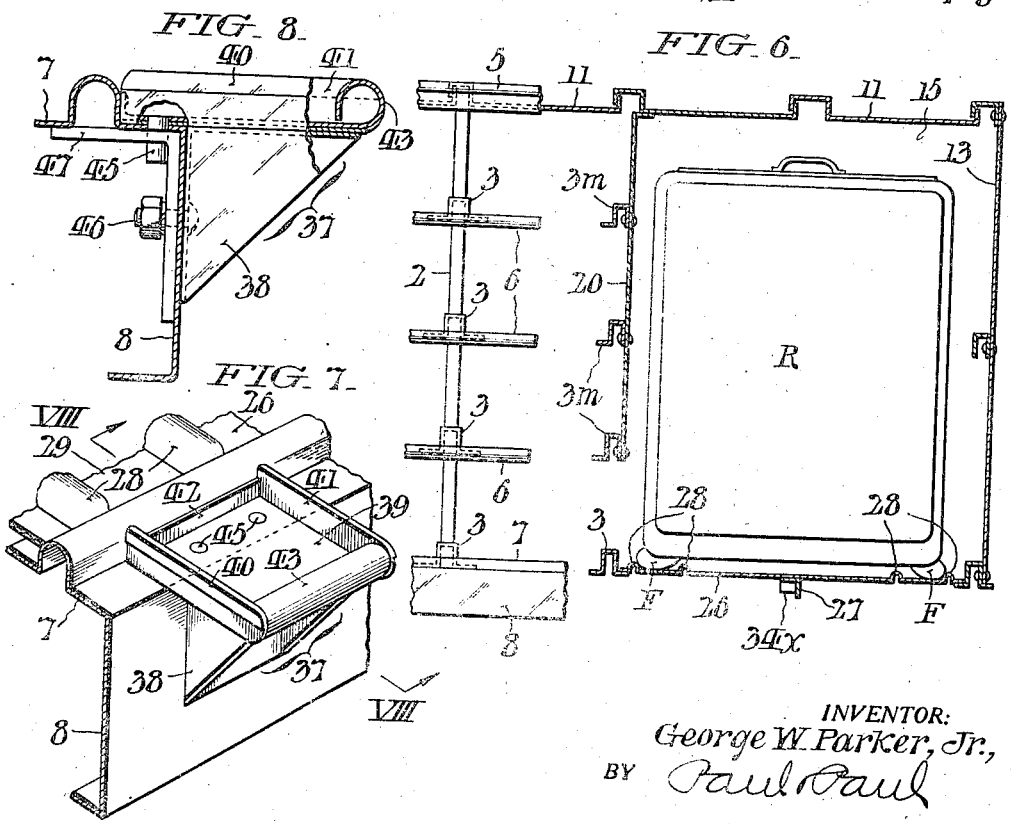

May 11, 1943.　　　　G. W. PARKER, JR　　　　2,318,794
TRUCK BODY
Original Filed Dec. 1, 1938　　8 Sheets-Sheet 4
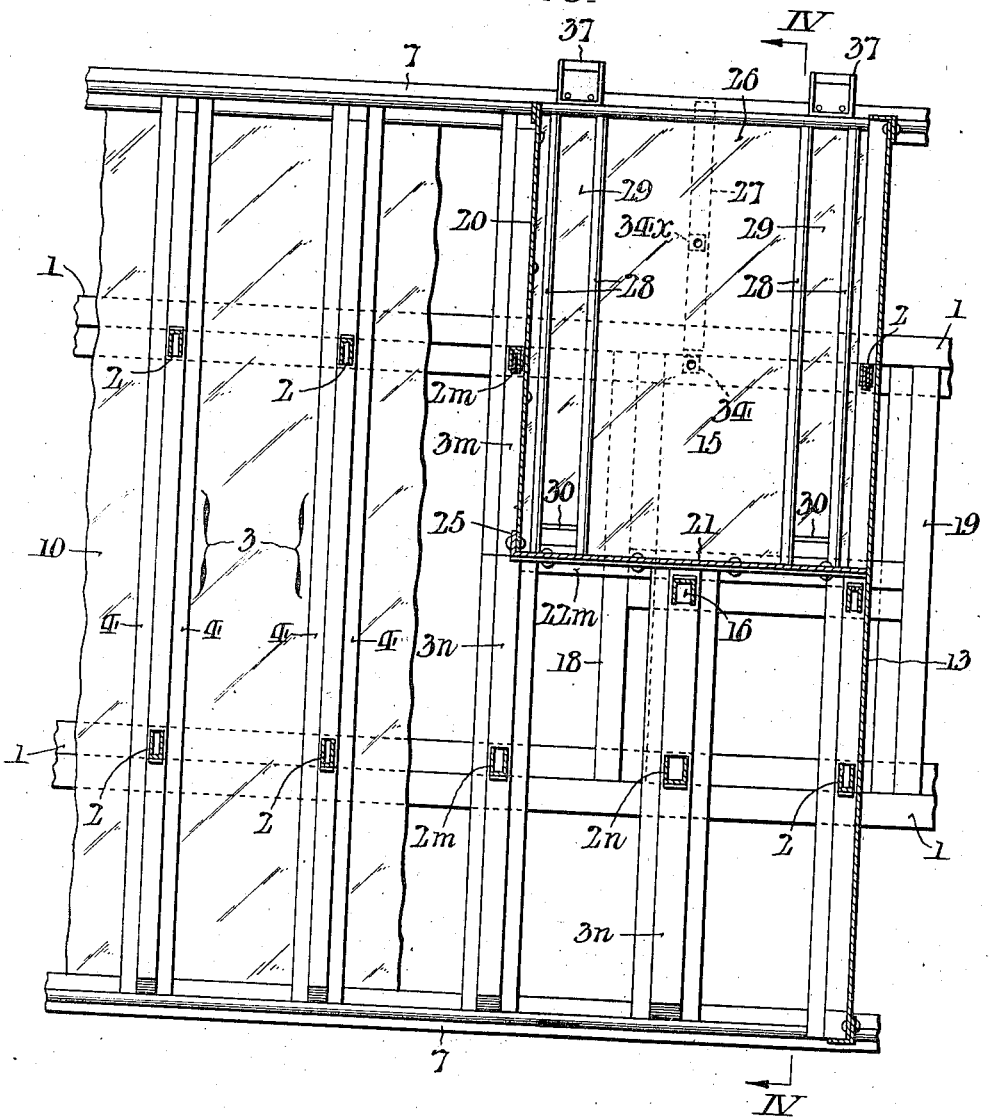

May 11, 1943.　　　　G. W. PARKER, JR　　　　2,318,794
TRUCK BODY
Original Filed Dec. 1, 1938　　　8 Sheets-Sheet 5
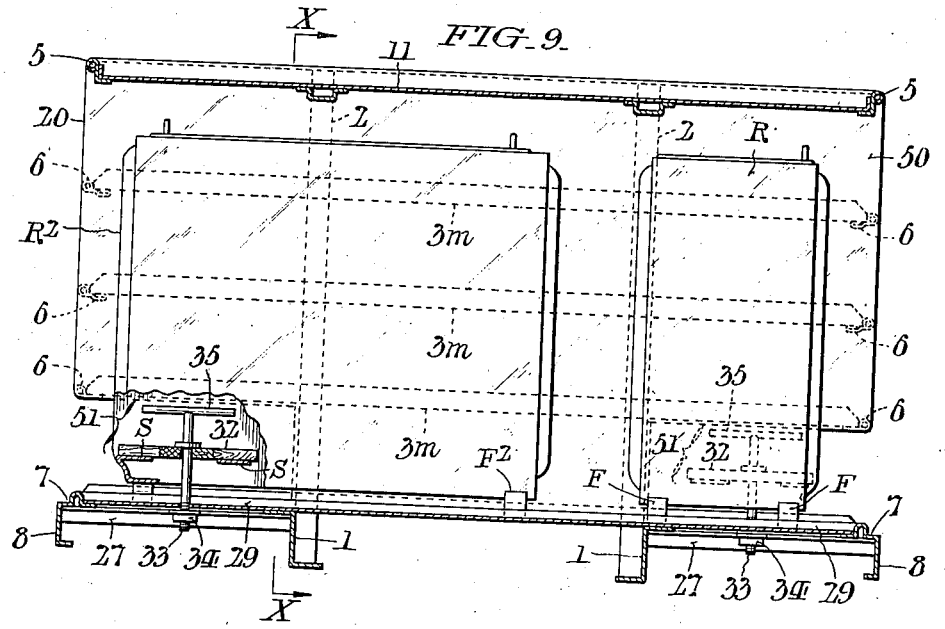
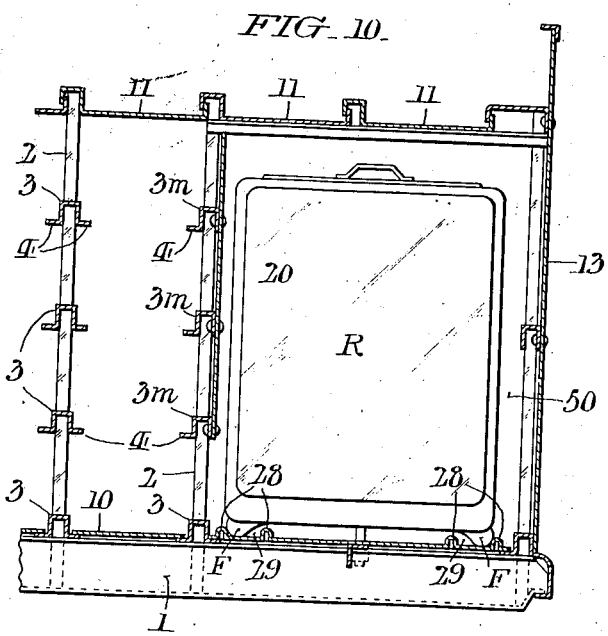

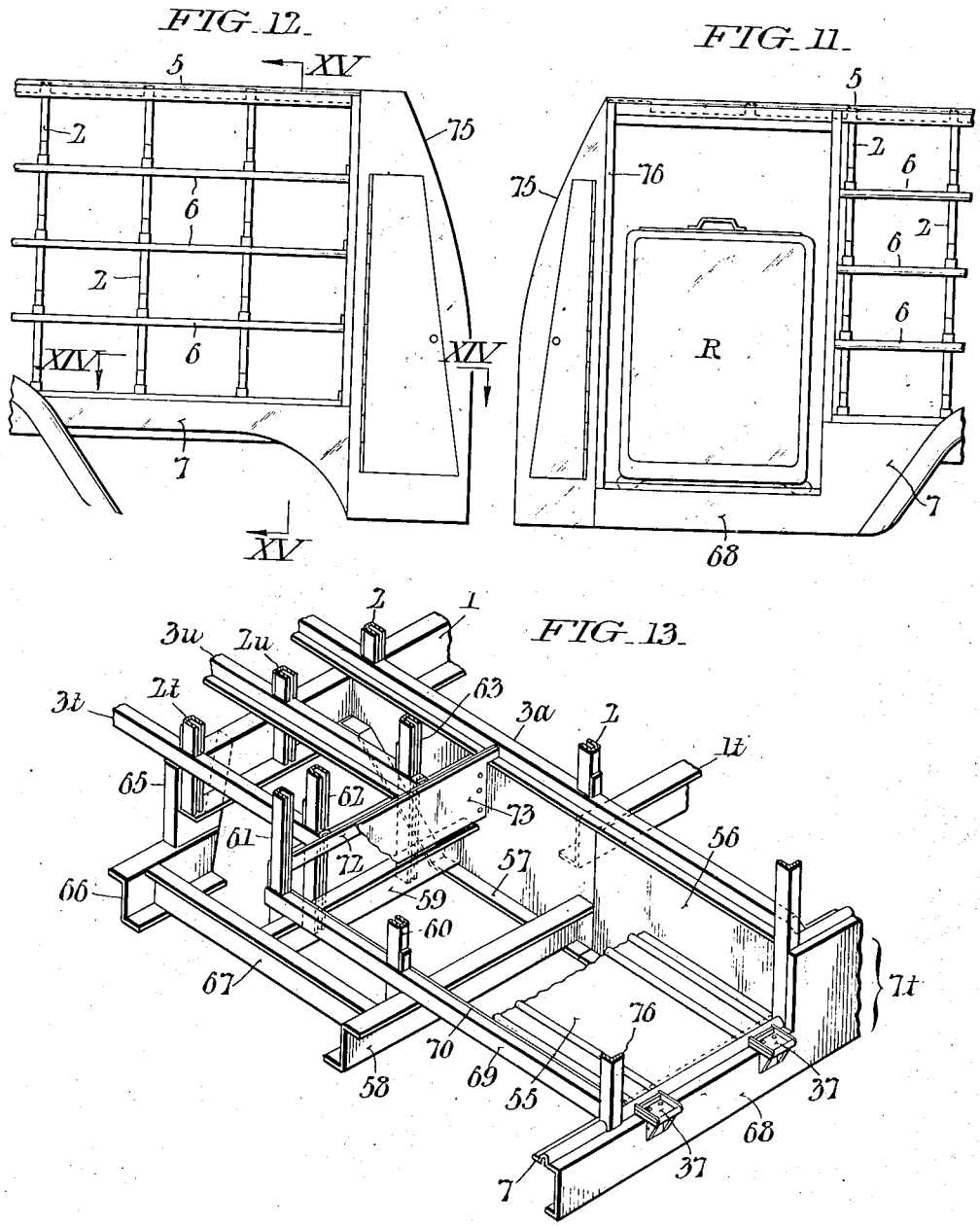

May 11, 1943.  G. W. PARKER, JR  2,318,794
TRUCK BODY
Original Filed Dec. 1, 1938   8 Sheets-Sheet 7
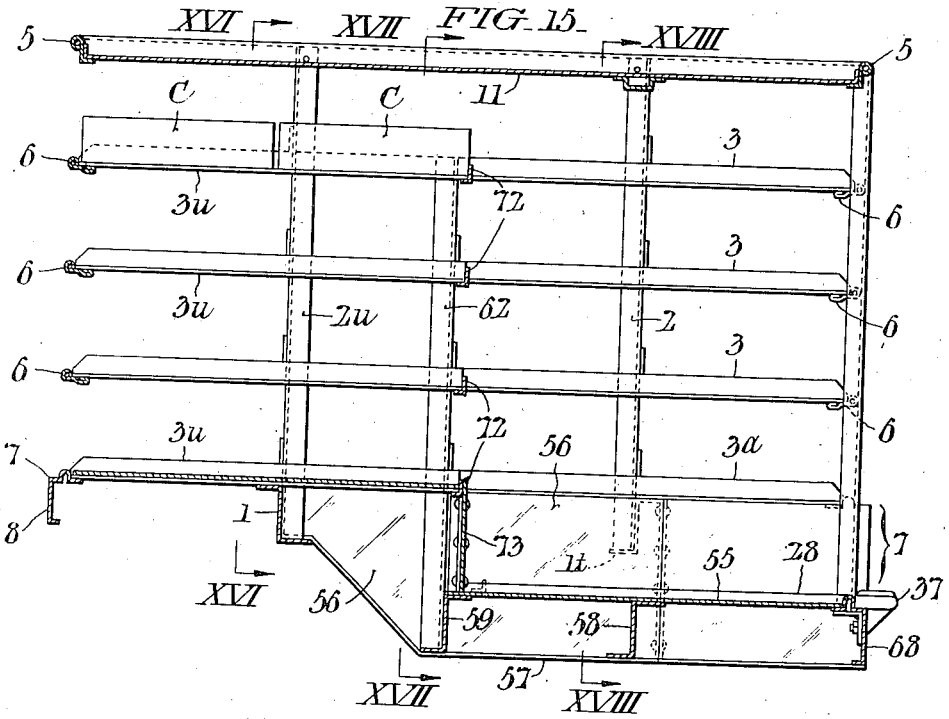
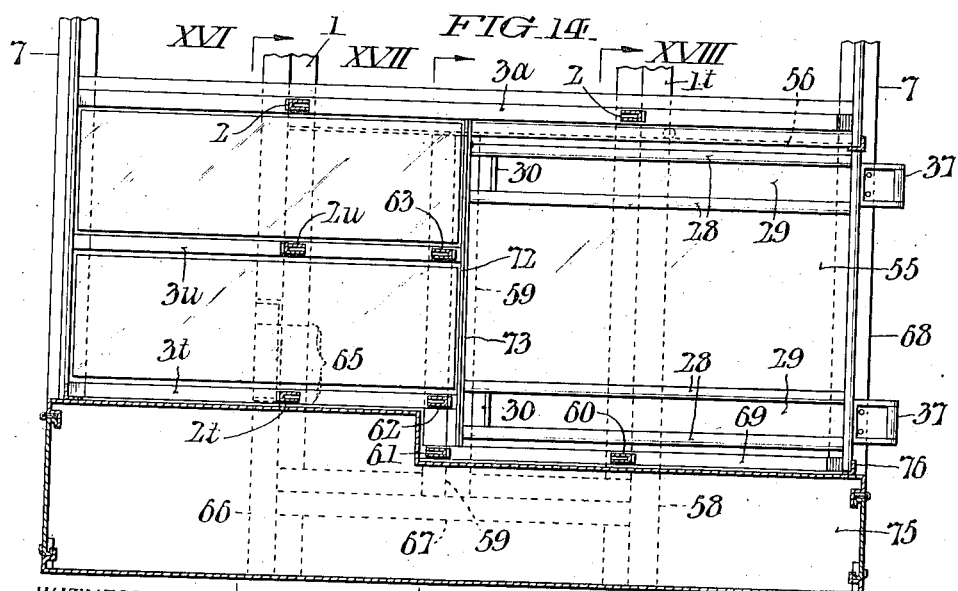
INVENTOR:
George W. Parker, Jr.,
BY
ATTORNEYS.

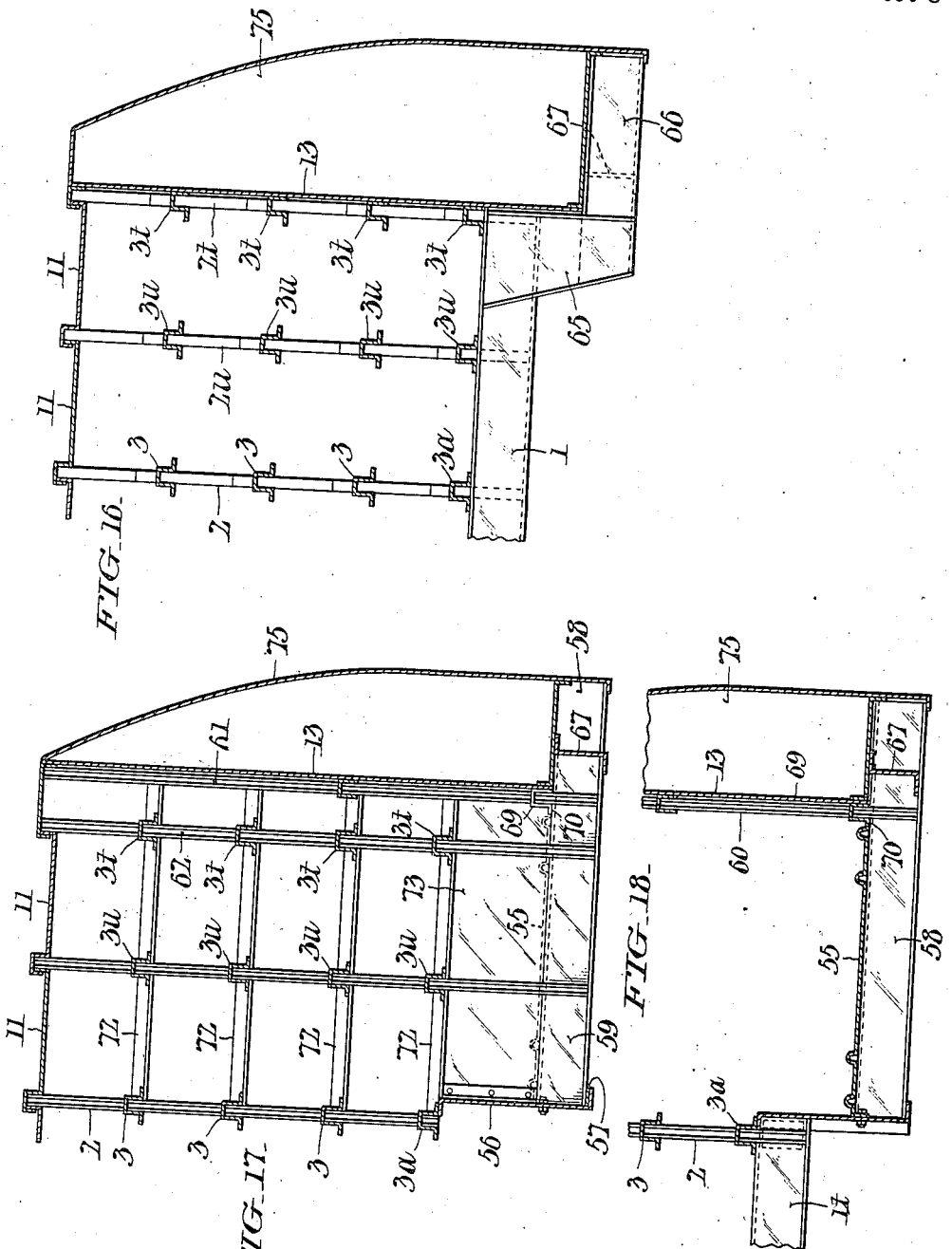

Patented May 11, 1943

2,318,794

UNITED STATES PATENT OFFICE 2,318,794

TRUCK BODY

George W. Parker, Jr., Philadelphia, Pa., assignor to Specialty Engineering Company, Philadelphia, Pa., a corporation of Pennsylvania Original application December 1, 1938, Serial No. 243,327. Divided and this application October 24, 1940, Serial No. 362,510

8 Claims. (Cl. 296—3)

This invention relates to bodies useful in connection with commercial vehicles, and has reference more especially to truck bodies of the rack type with multiple recesses or cells for cases of bottled commodities which are accessible for convenience of ready loading and unloading from opposite sides of the vehicle, this application being a division of a co-pending application Serial No. 243,327 filed by me on December 1, 1938 now Patent No. 2,222,986, dated Nov. 26, 1940.

The present invention is concerned with improvements by which truck bodies of the kind referred to are adapted for carriage in addition to great numbers of bottle cases, of one or more coolers such as are commonly used in retail establishments where beverages are sold or dispensed, its chief aim being to afford a structure having the foregoing attributes, which, while being light in weight, is nevertheless strong and sturdy for capacity to resist distortion incident to travel of the vehicle over rough roads, and which can be economically produced from sheet metal.

Other objects and attendant advantages will appear from the following detailed description of the attached drawings, wherein Fig. 1 is a view partly in side elevation and partly in longitudinal section, of a truck body constructed in accordance with my invention, and having a compartment for coolers at one side thereof at the rear.

Fig. 2 is a fragmentary view showing the elevation of the compartment side of the body.

Figs. 3 and 4 are cross sectional views taken as respectively indicated by the angled arrows III—III and IV—IV in Fig. 1.

Fig. 5 is a horizontal sectional view taken as indicated by the angled arrows V—V in Fig. 1.

Fig. 6 is a view partly in side elevation and partly in section taken as indicated by the arrows VI—VI in Fig. 4.

Fig. 7 is a perspective view of an outboard bracket extension provided on the truck body of Figs. 5 and 6 for supporting a foot of the cooler.

Fig. 8 is a detail sectional view taken as indicated by the angled arrows VIII—VIII in Fig. 7.

Fig. 9 is a transverse sectional view of an alternative form of my improved truck body having a cooler compartment extending all the way there-across.

Fig. 10 is a fragmentary longitudinal sectional view taken as indicated by the angled arrows X—X in Fig. 9.

Figs. 11 and 12 are views like Figs. 1 and 2 showing another alternative form of a truck body wherein the floor of the cooler compartment is depressed relative to the floor of the body.

Fig. 13 is a fragmentary perspective view of the truck body shown in Figs. 11 and 12.

Fig. 14 is a plan section taken as indicated by the angled arrows XIV—XIV in Fig. 12.

Fig. 15 is a cross section taken as indicated by the angled arrows XV—XV in Fig. 12; and Figs. 16, 17, and 18 are fragmentary views in longitudinal section taken as indicated by the arrows XVI—XVI, XVII—XVII, XVIII—XVIII in Figs. 14 and 15.

With reference first to Figs. 1–8 of these illustrations, my improved truck body is constructed wholly of sheet metal and comprises a pair of laterally spaced sills 1 which are of Z cross section and oppositely arranged with their lower flanges directed inwardly toward each other, see Figs. 3 and 4 more particularly. The body also includes uprights 2 of channel section which are arranged in equi-spaced relation along opposite sides of the body with their bottom ends resting on the lower flanges of the sills 1, and with their backs bearing against the vertical flanges of said sills. The uprights 2 are permanently secured to the sills 1, preferably by welding along the mutually contacting surfaces. At uniformly-spaced vertical intervals, transverse pairs of the uprights 2 are connected by cross members 3 which are of invert U cross section and which have laterally-projecting flanges 4. All the cross members 3 are apertured for passage through them of the uprights 2 as best shown in Fig. 5; and here again welding is preferably resorted to to connect said cross members to said uprights at the regions of juncture. From Fig. 3, it will be noted that the cross members 3 extend considerably beyond the uprights 2 at opposite sides of the truck, and to their ends are connected side rails 6 and 7 with upwardly directed flange beads and flat inwardly projecting horizontal flanges which under-reach the cross members and which are permanently connected to the latter likewise by welding. The lowermost rails 7 at opposite sides of the body are extended downwardly as at 8, to form ornamental aprons. The floor of the truck body is composed of weld-secured sheets 10 which fit between adjacent transverse pairs of the uprights 2, and rest upon the flat ledges of the lowermost side rails 7 and the lateral flanges of the corresponding lowermost cross members 3 which latter rest directly upon the sill rails 1 whereto they are also welded. The truck body is also provided with a roof composed of similar sheets 11 formed along corresponding side edges with box beads which fit down over the tops of the uprights 2 and to the outer edges of which the top side rails shown at 5 are secured. From Fig. 1, it will be further noted that the endmost cross members 3 are devoid of lateral flanges at their outer sides to which latter are secured front and rear end walls 12 and 13 of sheet material. Due to the aforedescribed arrangement of the uprights 2 and cross members 3, there is defined a plurality of transversely extending subdivisions which are accessible from the sides of the body for insertion and withdrawal of bottle cases such as shown at C in Fig. 1. In the lower subdivisions, the bottle cases C rest upon the floor plates 10 and are held against displacement by the upstanding portions of the cross members 3 and the beads of the lower-most side rails 7; while those in the other subdivisions rest on the lateral flanges of corresponding cross members 3 and are in turn held against displacement by the beads of the side rails 6.

As shown in Figs. 1, 4, 5 and 6, a compartment 15 is provided at the rear of the body at one side for reception and carriage of a refrigerating cooler R of the type ordinarily used in establishments where bottled beverages are sold or dispensed. In this construction, one or more uprights or posts 2 are omitted at the compartment side of the body, and the intermediate side rails 6m terminated at intermediate cross members 3m which are supported by the uprights designated 2m. The cross members designated 3n, it will be noted from Figs. 4 and 5, terminate in the longitudinal median plane of the body and are there supported by a supplemental upright or post 16 whereof the bottom end is secured to a short supplemental center sill 17 supported by beams 18 and 19 which extends crosswise between the main sills 1, 1. For the purposes of greater rigidity, the auxiliary upright 16 and the corresponding regular upright at 2n are made wider than the other uprights as are also the corresponding cross members 3n. This is also the case with the uprights 2m and the corresponding cross members 3m, which latter, except for the lowermost one, are devoid of lateral flanges at one side. The rear end wall 13 of the truck body also serves as the outer end wall of the compartment 15, the inner side wall and the back wall of said compartment being formed by sheets 20 and 21. As shown, the sheet 20 is bolted to the cross members 3m, while the sheet 21 is bolted top and bottom to longitudinal angle bars 22, 23 of which the former is secured to certain of the roof sheets 11, and the latter to the supplemental sill 17, see Fig. 4. At intermediate points the wall sheet 21 is secured to angle bars 22m carried by the inner ends of the short cross members 3n. The inner edge of the sheet 21, see Figs. 4 and 5, is bolted to a laterally bent flange 25 at the inner edge of the sheet 21. The floor sheet 26 for the compartment 15 is supported by the supplemental sill 17, and by the regular sill 1 and the lower side rail 7 at the compartment side of the body, as well as by a beam 27 bridged between said regular sill and side rail. Adjacent each of its opposite long edges, the compartment floor sheet 26 is provided with a pair of upstanding parallel ridges 28, the intervals between these ribs constituting grooves or tracks 29 for the feet F of the refrigerating coolers R, R$^1$, R$^2$ of different sizes and capacities which may be carried in the body, see Fig. 4. Secured within the grooves 29 near the inner ends of the latter are lugs 30 which, see Fig. 5, serve as stops for the corresponding pairs of feet F of the coolers to keep them away from the wall 21. For the purpose of preventing shifting of the coolers, in the body during transit, a hold down clamp 31, see Fig. 4 has been provided. As shown, the clamp 31 comprises a clamp bar 32 for bridging adjacent slats 5 in the bottoms of the coolers, said bar being swingable about a spindle 33 whereof the lower end is threaded and selectively engageable with nuts 34, 34x which are welded fast to the under side of the floor 26 of the compartment and which are so spaced that the first serves for coolers R, R$^1$ of the small and intermediate sizes, and the second for the cooler R$^2$ of the largest size. At the top, the clamp spindle 33 has a crosswise manipulating handle bar 35, and at an intermediate point a collar 36 which is adapted to bear down upon the clamp bar. For the support of the feet F$^2$ at the projecting end of the largest cooler R$^2$, the body is provided, see Fig. 4, with outboard extension brackets 37 in line with the grooves 29, one of these brackets being illustrated in detail in Figs. 7 and 8. As shown, each bracket 37 includes a bracing component 38 of sheet metal which abuts the vertical face of apron 8 of the lower side rail 7 at the compartment side of the truck body, and a horizontal foot supporting component 39, likewise of sheet metal, which is welded to the top of the component 38 and which overhangs the latter so as to rest on the top of said side rail 7. The component 39 has upstanding side and end flanges 40, 41 and 42, 43 respectively with resultant formation of a recessed retaining seat or socket for the foot of the cooler, the outer end flange 43 being rounded as shown to facilitate sliding of the cooler foot thereover incident to loading and unloading. Pendant from the overhanging portion of the component 39 is a pair of studs 45 which engage holes in the top of the side rail 7. The vertical web of the component 38 is pierced for passage of a securing screw bolt 46. At the region of each of the brackets 37, the side rail 7 is reinforced by a backing angle 47 the flanges of which are penetrated by the studs 45 as well as by the securing bolts 46.

The alternative form of my invention illustrated in Figs. 9 and 10 is generally of the same construction as the form of Figs. 1-6, except in that here the compartment 50 extends from side to side of the truck body, thereby making it possible to carry two refrigerating coolers side by side, for example, one of the large type coolers R$^2$ and one of the smaller ones of the type R. In this modification, hold-down clamps 51 like those of the first described form of my invention are provided to hold the individual coolers against shifting during transit. In Figs. 9 and 10, the component parts of the clamps 51 have been identified with the same reference characters previously employed so that necessity for repetitive description may be dispensed with.

The alternative form of my invention illustrated in Figs. 11-18 is like that of Figs. 1 and 2 except in that here the floor 55 of the cooler compartment at one side of the truck is depressed below the floor level of said body to provide more head room and thus make it easier to load and unload the coolers. As shown in Fig. 13, the main sill 1t at the compartment side of the body is shorter than the other main sill 1 and abuts a transverse beam 56 which is supported at one end by said main sill 1, and at the opposite end by the lowermost side rail 7t also at the compartment side of the body. At its top, the beam 56 is welded or otherwise secured to the main sill 1t as well as to one of the lowermost cross members designated 3a which latter extends all the way across the body. Along its lower edge, the bear 56 has a laterally-projecting flange 57 on which rest the front ends of a pair of Z section sub-sills 58, 59, the first sub-sill being in line with the regular sill 1t, and the second is positioned in the vertical median plane of the truck body. Rising from the sub-sill 58 is a supplemental upright 60. Also rising from the sub-sill 59 in the interval between the supplemental upright 61 and the crossbeam 56 are supplemental uprights 62, 63 which are in spaced transverse planes with corresponding supplemental uprights 3t, 3u upstanding from the main sill 1. The cross members 3t, 3u, which correspond to the uprights 2t, 2u, terminate at the uprights 62, 63. Supported by a drop channel bracket 65, at the end of the main sill 1 is a short sub-sill 66 of Z section; and extending crosswise between said sub-sill 66 and the end of the sub-sill 58 is a beam 67 of Z section whereof the lower flange supports the end of the intermediate sub-sill 59. The portion of the lower side rail 7t at the compartment side of the truck body is depressed as at 68 rearwardly of the beam 56 to the level of the sub-sills 58, 59. Resting on and secured to the tops respectively of sub-sills 58, 59 as well as to the depressed end portion 68 of the side rail 7t is an inverted U section cross member 69 with a lateral flange 70 at its inner side, which, with the tops of the parts 58, 59 and 68, support the floor sheet 55 of the compartment. At their inner ends, the cross members 3t, 3u rest on a longitudinal angle bar 72, which is secured to the cross beam 56 and to the uprights 61, 62, 63; and closing the space between the sub-sill 59 and said angle bar 72 is a sheet 73 which forms the inner wall of the compartment. At the side opposite the cross web 56, the compartment is defined by the front wall of a utility compartment 75 which rests on the portion of the sub-sills 58, 66 rearward of the supplemental uprights 60, 61 and on a transversely aligned angle section upright, such as the one at 76, rising from the lowermost side rails 7 and 7t.

If desired, the cooler compartment of the truck body featured in Figs. 11-14 may be made to extend from side to side of said body, by resorting to simple changes which will be readily understood upon reference to Fig. 13.

Having thus described my invention, I claim:

1. A truck body for delivery vehicles comprising a pair of laterally-spaced main sills whereof one extends rearwardly beyond the other; uprights arranged at corresponding intervals along the sills within the length of the shorter sill; cross members secured to transversely-aligned pairs of the uprights at different levels, said cross members extending beyond the uprights at opposite sides of the body and providing ledges for supporting, between uprights, cases containing beverage bottles; upper and lower side rails corresponding in length to the longer sill and connecting the ends of the upper and lowermost cross members, the portion of the lowermost rail at one side of the truck rearward of the shorter main sill being depressed; a cross beam abutted by the short main sill and bridged between the long main sill and the depressed end portion of the longer main sill; a sub-sill in line with the short main sill extending rearward from the cross beam; a second sub-sill intermediate the main sill, said second sub-sill extending rearward from the cross beam and being supported at its rear end from a cross member bridged between the end of the first mentioned sub-sill and a short end of the long main sub-sill suspended from the end of the long main sill; transversely-aligned supplemental uprights rising respectively from the end of the depressed portion of the lowermost side rails aforesaid and the ends of the first and second sub-sills, with resultant formation of a compartment at the rear of the body at one side for the reception of refrigerating coolers such as are used in retail establishments where the bottled beverages are sold; a floor for the compartment supported by the depressed portion of the aforementioned lower side rail and the two first-mentioned sub-sills; other transversely-aligned supplemental intermediate uprights arranged at corresponding intervals along the long main rail and the second sub-sill rearward of the cross beam; and short supplemental cross members secured to said other supplemental uprights terminating at their inner ends at the supplemental uprights rising from said second sub-sill.

2. A truck body for delivery vehicles comprising a pair of laterally spaced main sills; uprights arranged at substantially uniform intervals along the full length of one of the sills; similar uprights arranged at corresponding intervals along a portion of the other main sill but omitted at another portion of the latter to provide a void for the purposes of a relatively large auxiliary compartment at that side of the body; a supplemental sill intermediate the main sills along the region of omission of the uprights of the second mentioned sill and supported by a cross member extending between the main sills; supplemental uprights arranged along the supplemental sill at intervals to correspond with the additional uprights along the first mentioned sill; full width cross members secured at different levels to transversely aligned pairs of uprights along the main sills at opposite sides of the body, and short supplemental cross members connecting the aforesaid additional uprights along the first mentioned main sill and the corresponding supplemental uprights at corresponding levels, said cross members being all provided with lateral ledges for supporting commodity cases or packages between adjacent uprights; and a floor for the compartment supported by the second mentioned main sill and the supplemental main sill.

3. A truck body according to claim 2, wherein the main cross members extend between the uprights along opposite sides of the truck and the short cross members extend to a corresponding distance beyond the first mentioned main sill; and wherein the ends of the cross members at corresponding levels are connected by side rails which extend longitudinally of the body.

4. A truck body for delivery vehicles comprising a pair of laterally spaced main sills whereof one extends rearwardly beyond the other; uprights arranged at corresponding intervals along the sills within the length of the shorter sill; cross members secured to transversely aligned pairs of the uprights at different levels and providing ledges for supporting individual cases or packages between adjacent uprights; a relatively deep cross beam bridged between the end of the short main sill and the long main sill; a supplemental sub-sill in line with the short main sill extending rearward from the cross beam at the bottom; a second supplemental sub-sill intermediate the main sills, said second or intermediate sub-sill extending rearward from the cross beam and being supported at its rear end from a cross member projecting between the end of the first mentioned sub-sill and a short supplemental sub-sill suspended from the end of the long main sill; transversely aligned supplemental uprights rising respectively from the ends of the first and second sub-sills with resultant formation of an auxiliary compartment at the rear end of the body at one side thereof for the reception of articles larger than the boxes or packages; a floor for the compartment supported by the two sub-sills; other transversely aligned supplemental intermediate uprights arranged at corresponding intervals along the long main sill and the intermediate sub-sill rearward of the cross beam; and short supplemental cross members secured to said other supplemental uprights terminating at their inner ends at the supplemental uprights which rise from said intermediate sub-sill.

5. A truck body according to claim 2, wherein the main cross members extend between the uprights along opposite sides of the truck and the short cross members extend to a corresponding distance beyond the first mentioned main sill; and wherein the ends of the cross members at corresponding levels are connected by side rails which extend longitudinally of the body, except for the side rails intermediate the upper and lowermost ones which are interrupted at one side of the body for convenience of access to the compartment.

6. A truck body for delivery vehicles comprising a pair of laterally-spaced sills; uprights arranged at corresponding intervals along the sills, said uprights being uniformly spaced except at one point at least at one side of the body to set apart a relatively wider full height space for the purposes of a comparatively large transverse compartment; cross members secured at different levels to transversely-aligned pairs of the uprights and projecting therebyond at opposite sides of the body with the lowermost of said uprights resting on the sills; upper and lower longitudinals connecting the ends of the upper and lowermost cross members; and intermediate longitudinals connecting the ends of the intermediate cross members except at said compartment.

7. A truck body according to claim 6, in which the cross members are provided with lateral ledges for supporting commodity cases or packages between adjacent uprights except the uppermost and intermediate cross members at opposite sides of the compartment which are devoid of lateral projections within said compartment.

8. A truck body according to claim 6, in which the cross members are provided with lateral ledges for supporting commodity cases or packages between adjacent uprights except the uppermost and intermediate cross members at opposite sides of the compartment which are devoid of lateral projections within said compartment; in which a roof sheet for the compartment is supported by the uprights at opposite sides of said compartment; in which side wall sheets are attached to the cross members within the compartment; and in which a floor sheet is supported within the compartment jointly by the sills, the lowermost cross members and the lowermost end longitudinals.

GEORGE W. PARKER, Jr.